UNITED STATES PATENT OFFICE.

HERVEY BATES, JR., OF INDIANAPOLIS, INDIANA.

CORN PRODUCT FOR BREWERS' USE AND PROCESS OF MAKING SAME.

SPECIFICATION forming part of Letters Patent No. 437,964, dated October 7, 1890.

Application filed July 21, 1890. Serial No. 359,423. (No specimens.)

*To all whom it may concern:*

Be it known that I, HERVEY BATES, Jr., a citizen of the United States, residing at Indianapolis, in the county of Marion and State of Indiana, have invented certain new and useful Improvements in Corn Product for Brewers' Use; and I do hereby declare the following to be a full, clear, and exact description of the invention, such as will enable others skilled in the art to which it appertains to make and use the same.

This invention relates to the art of manufacturing from "Indian corn" or "maize" a product specially adapted to brewing purposes.

My invention has for its object the production of a new alimentary product from Indian corn and maize which shall have especial adaptitude for brewing purposes.

It is well known by those skilled in the treatment of Indian corn or maize to bring it to a condition for use by brewers that it is impossible to rupture the starch-corpuscles of the grain by crushing it in a dry state, and hence various plans have been suggested and a variety of processes devised involving the generic idea of moistening the grain and subsequently crushing it, so as to expose the starchy contents, whereby it may be directly acted upon by the diastase of the malt in brewing.

The main object of my invention is to accomplish this result in a novel manner, and at the same time to give to the product certain desirable characteristics not heretofore obtained by any process of manufacture of which I am aware.

In order that those skilled in the art may know how to practice my improved process and fully understand the resultant effects, I will proceed to describe the several steps of my improved process and the order in which they are taken, and to define the characteristics of the product by which it may be readily distinguished from analogous products.

To carry out this invention the corn is first subjected to the process of hulling and degerminating for the removal of the exterior skin from the kernel and extracting the germ. The hard corn granules are then placed in a suitable basin or tank of warm water, plenty of water being used, to completely soften and bleach the granules, care being taken to keep the temperature high enough to hasten the softening process and yet sufficiently below the boiling-point to obviate any possibility of cooking the corn, thereby gelatinizing the starch, or toughening the granules in any way. The exact temperature and length of time will vary with the condition of the corn, new corn, as a rule, being softer and tenderer to begin with than old corn. A little experience enables the operator to judge of the proper temperature. I have found from experience that good results are obtained by the use of water varying in temperature from 70° to 100° Fahrenheit. When the granules have become soft throughout their entire mass, they are conveyed from the tank and are passed between closely-adjusted cold rolls, when all of the starch-corpuscles throughout the soft and swollen kernel are ruptured and the starchy contents freely exposed. After leaving the rolls, the completed product is produced by drying the laminated particles in any well-known way, the result being dry tender approximately-white absorbent flakes.

It has been common heretofore to soften corn by cooking it; but this gelatinizes the starch and greatly deteriorates the value for brewers' use. The same may also be said of steaming, which acts chemically on the component parts of the kernel and toughens as well as softens the grain.

I am aware that it is not new in the treatment of Indian corn or maize to first effect a separation of the hulls and impurities from the kernels in a variety of ways and then to subject the granular product to the action of steam, and subsequently to roll the same between heated rolls to bring the product into the condition of flakes; but this mode of treatment, which necessarily subjects the corn to a high degree of heat, (which must exist in the steam,) and to a greater or less degree, according to the temperature of the "heated" rolls, results in gelatinizing the starch and a partial conversion of the same into sugar, so that the final product—namely, the thin white flakes—have a hard or semi-gelatinized quality, which requires some appreciable time to soften by contact with moisture. I do not, therefore lay claim to any such process or to any such resultant product, my process and product differing therefrom in the particular that at no time do I allow the material being treated to be subjected to a cooking heat, and I thereby avoid any possibility of any cooking effect, and as a result the finished product consists of thin flakes, which are dry, very tender, approximately white, and exceedingly absorbent.

It is not desired to limit this invention to corn which has been hulled and degerminized. While this step is desirable in that by the removal of these unessential parts a cleaner product is obtained, it is evident that grain in its entirety may be used, or, if desired, the hominy, grits, or corn-meal of commerce might be substituted without departing from the spirit of this invention or seriously impairing the value of the product for brewers' use.

The soaking of corn in water warmed to accelerate the softening without steaming or cooking is claimed only when combined with the step of passing the soft particles between close cold rolls, whereby the starch-cells are ruptured, and of subsequently drying, as specified. By said steps this process is distinguished from any other for the preparation of corn for brewing purposes.

I claim—

1. As a new article of manufacture, the herein-described corn product, consisting of dry, very tender, uncooked, or gelatinized and very absorbent flakes.

2. The process of preparing corn, which consists in soaking the corn in warm water (in contradistinction to the use of steam) until perfectly soft throughout, then draining the water from the grains, then rupturing the maximum of starch-corpuscles by laminating the grain between cold rolls, and subsequently drying the resulting flakes, substantially as hereinbefore described.

In testimony whereof I affix my signature in presence of two witnesses.

HERVEY BATES, Jr.

Witnesses:
JOSEPH A. MINTURN,
T. F. MEANY.